Nov. 14, 1939.  A. P. B. RENSHAW  2,180,300
CONTROL SYSTEM
Original Filed Jan. 19, 1935  3 Sheets-Sheet 3
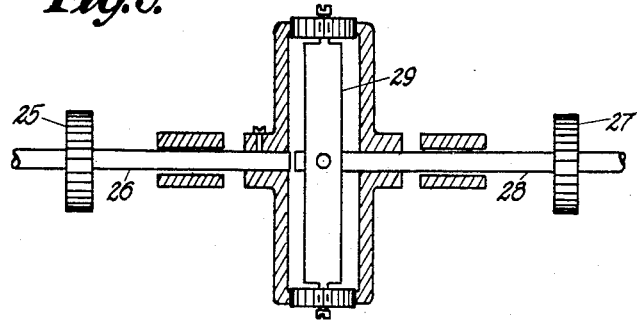
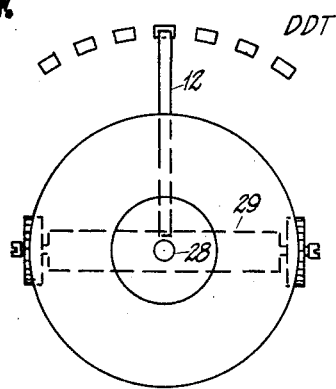
INVENTOR.
ALFRED PERCY BAILEY RENSHAW
BY Edward H. Eames
ATTORNEY Patented Nov. 14, 1939

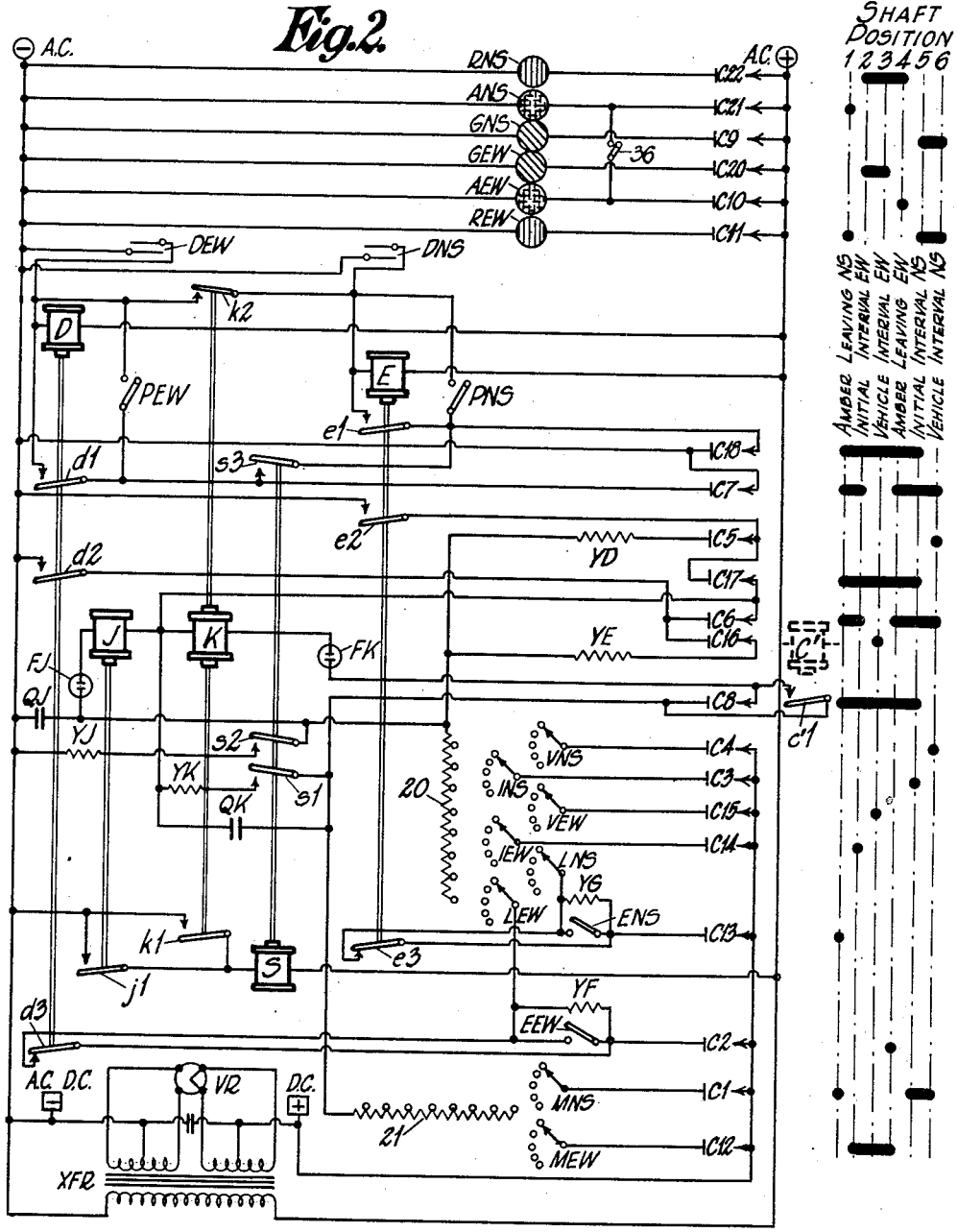

2,180,300

UNITED STATES PATENT OFFICE 2,180,300

CONTROL SYSTEM

Alfred Percy Bailey Renshaw, Kingston Hill, England, assignor, by mesne assignments, to Automatic Telephone & Electric Company Limited, London, England Original application January 19, 1935, Serial No. 2,480. Divided and this application May 5, 1937, Serial No. 140,873. In Great Britain February 5, 1934

6 Claims. (Cl. 172—293)

The present application is a division of my co-pending application Serial Number 2,480, filed January 19, 1935, and issued on January 11, 1938, as Patent 2,105,443. The co-pending application referred to relates to traffic control systems and especially to a progressive type of traffic control system in which a number of controllers located at adjacent intersections are controlled by a master timer whose cycle length is in turn regulated or adjusted in accordance with the cycle length of a representative or so-called key controller. No claim is made in the present application to traffic control systems as such, such systems being claimed in the co-pending application.

The present application discloses for illustration an embodiment of the invention as applied to the traffic control system of the co-pending application, but the invention in the present application is concerned generally with the provision of a synchronizing system for two timers having variable cycle lengths, and more particularly with a cycle adjusting arrangement for varying the cycle time of one timer to approximate the cycle time of another timer.

Accordingly, it is an object of the present invention to provide a synchronizing or cycle adjusting arrangement for primary and secondary cyclically operating timers such that the cycle time of the secondary timer is subject to variation at the end of each cycle, the cycle time of the secondary being lengthened by a unit amount if the primary timer completes a corresponding cycle after the secondary, and being shortened by a unit amount if the primary timer completes its cycle before the secondary.

For the purpose of illustration an embodiment of the present invention in adjusting the cycle of a secondary timer is disclosed herein as applied to a traffic control system. In applying the principles of the invention to a traffic control system, for example, the area in which signals are to be controlled is first surveyed as regards its traffic conditions to locate what will be known as the key intersections, that is, in effect sample intersections or intersections at which the conditions may be considered as typical of those existing at the intersections in the immediate vicinity. When the key intersections have been selected, the remaining intersections to be controlled are shared out between them with the result that the area is split up into a number of groups, each containing a key intersection and half a dozen or so dependent intersections which are assumed to have similar traffic conditions and are controlled from the key intersection of the group. In each group this key intersection is provided with a key controller and a master timer, construction of which will subsequently appear, and vehicle actuatable devices, or detectors, in each of its several lanes of approach. The dependent intersections of each group are equipped with controllers which may be regulated from the master timer of that group in a desired phase relationship with one another.

For the purposes of this application the primary timer is considered to be the key controller and the secondary timer the master timer. The controller at the key intersection, which is fully vehicle-actuated, is arranged to cooperate with the master timer so that if the key controller or primary timer operates on a shorter cycle than the master or secondary timer an adjustment will automatically be made at the end of the master timer cycle so that its following cycle will be shorter. If, on the other hand, the master timer finishes its cycle first, an adjustment will be made to increase the length of its following cycle. In each case the adjustment will not be sufficient to correct the master timer cycle completely unless the discrepancy is very small; otherwise the cycle would vary as at a fully vehicle-actuated intersection and a progressive flexible system would be impossible. Small adjustments therefore, only are made and the master timer cycle value becomes an average of the cycle time of the key controller. If the key controller finishes its cycle before the master timer, it waits until the master timer has finished its cycle, and it is clearly desirable that the controller shall be connected so that at the end of the cycle right of way is with the main road. If the key controller finishes its cycle after the master timer after possibly some degree of curtailment, it will immediately start its next cycle, but the master timer itself does not stop under any conditions. By this means the dependent controllers can be linked to form a progressive system which is governed by a cycle time varying on the average with that at the key point.

The description will be made clearer with reference to the accompanying drawings which illustrate one practical embodiment of the invention, and in which:

Figure 2 is a circuit diagram for a full actuated type of traffic signal controller whose operation is dependent upon actuation of vehicle actuatable detectors or road pads in the several approaches to the intersection and upon pulsing from the master timer.

Figures 3 and 4 are each sectional views of a conventional differential gearing arrangement, utilized in a rotary stepping switch with dual stepping magnet and ratchet apparatus for producing movement of the wiper arms either clockwise or counter-clockwise for use in the master timer.

Figure 1:
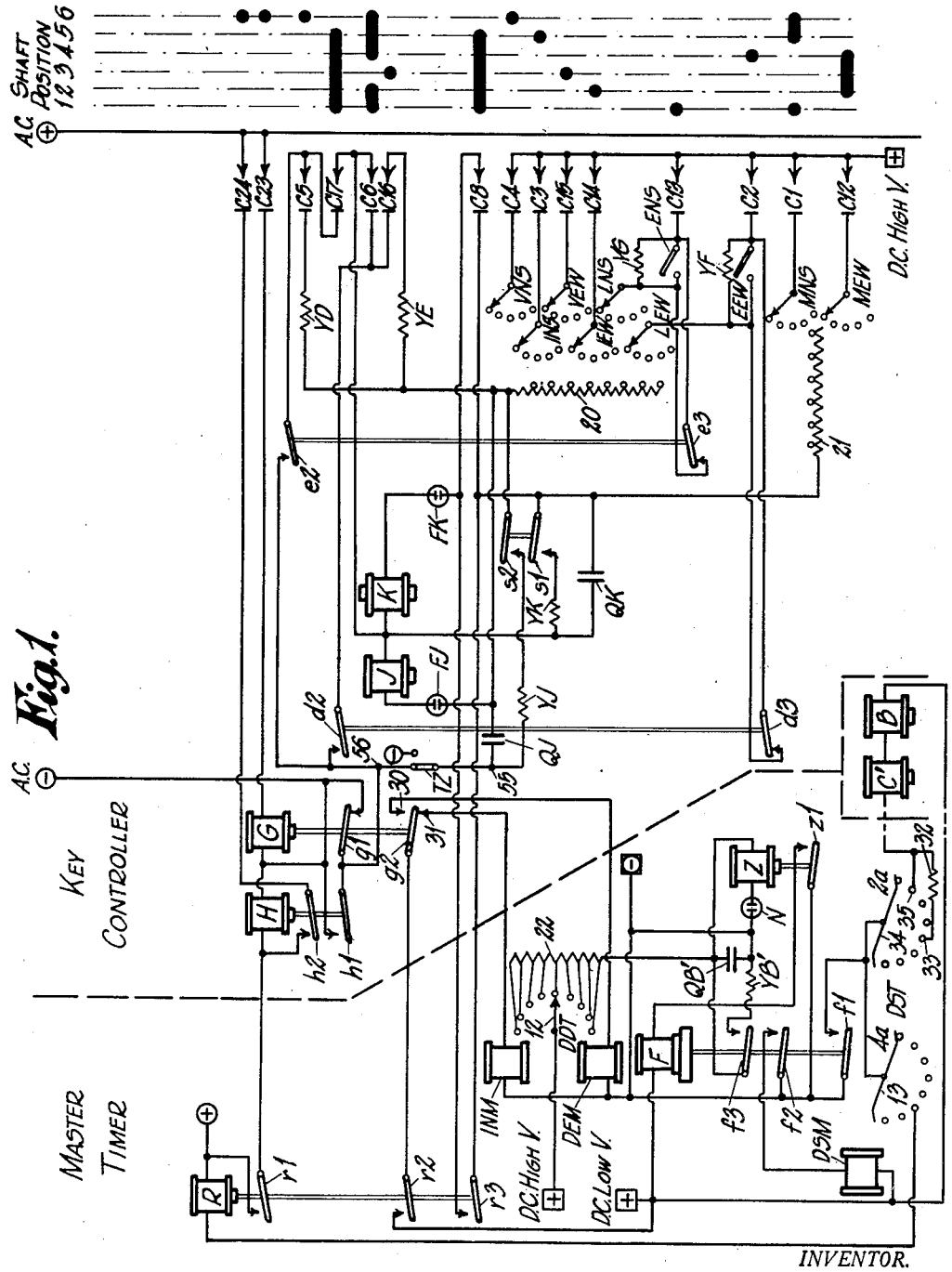
Figure 1 shows one embodiment of the invention, applying to traffic control systems, and includes a portion of a key intersection signal controller or primary timer and a master or secondary timer and circuits interlinking them.

Referring now to Figure 1, there is represented a portion of a key controller for governing operation of the signals at a key intersection and a master timer, together with the apparatus for interlinking them in accordance with the principles of the invention. The remainder of the key controller, consisting principally of the road relays D and E, and road contacts DEW and DNS as well as the signal cams and circuits, is shown in Figure 2 and it will be understood that these elements also form part of the key controller of Figure 1.

The master timer may be conveniently of the type described in British Patent 403,732, and consists of a rotary stepping of telephone line switch in which the wiper arms on each of the several banks of the switch are advanced step by step by a magnet energized periodically by impulses from a condenser-neon tube timing arrangement. In one or more predetermined contact positions on each bank, circuit is closed to operate corresponding relays for governing the operation of the signal controllers at the several intersections of the group in the manner shown in the British patent noted.

Figure 2 is a circuit diagram of an individual full actuated type of traffic signal controller for use at any of the intersections of the group and adapted to have its operation governed by a relay C' which is controlled from a bank of the stepping switch of the master timer shown in Figure 1. The controllers of the group controlled by the master timer, except the key controller which is of the full actuated type, need not necessarily be full actuated as the controller of Figure 2 shown by way of example, but may be of the semi-actuated type having road pads only in the cross road, or of the type in which the instants of starting and ending each of the various signal displays are controlled entirely by pulses from the master timer.

The controller shown in Figure 2 comprises a number of sets of contacts for controlling the right of way signals and circuits for timing the display periods of the signals, these contacts being operated by a camshaft which is moved step by step thru a cycle by means of a solenoid. The stepping of the solenoid is governed by a timing circuit employing a neon lamp-condenser timer arranged to have its time periods varied under the control of vehicle detectors located in the roadway. Two separate timing circuits are employed and two road relays are provided which respond to the passage of vehicles over the detectors.

The current supply is assumed to be taken from alternating current mains and is rectified to provide direct current for the operation of the neon lamps. The transformer XFR feeds the valve rectifier VR. The ungrounded pole of the A. C. circuits is represented by a plus in a circle, the ungrounded pole of the D. C. circuits by a plus in a square and the common earthed pole by a minus in a circle and a square. The chart shows by a heavy black line or circle the positions of the camshaft in which the various cam contacts are closed. The various interval adjusting switchecs INS, VNS, IEW, VEW, LNS, LEW are wired to appropriate tapping points of the resistance 20, and similarly the switches MNS and MEW are wired to resistance 21 which gives tappings of higher value.

For convenience of description it will be assumed first of all that the cam shaft is standing in position 6 giving right of way to the street NS and that there is no traffic on either street. In these circumstances a charging circuit is completed over contacts C4 and the adjusting switch VNS via a part of resistance 20 for the condenser QJ, but owing to the fact that neither relay D nor relay E is operated in the absence of traffic assumed and the consequent absence of closure of road contacts DEW and DNS, and with contact d2 therefore open, it is impossible for discharge to take place through the neon lamp FJ when the condenser becomes charged to the striking voltage since cam contacts C16 and C17 are open in this position. This will be seen by tracing the operating circuit of relay J from the positive (right) side of condenser QJ via tube FJ, relay J, cam contacts C6, and contact d2 to the negative wire and side of condenser QJ. Moreover, while contacts d2 remain open no charging circuit is completed at this time for the condenser QK and the tube FK and relay K cannot be operated even though the armature c'1 be operated due to the receipt of a pulse from the master timer, so that solenoid S cannot be operated and the cam shaft will remain in this position. The charging circuit for condenser QK extends from positive D. C. via cam contact C1, adjusting switch MNS, part of resistance 21, through condenser QK and via contacts C6 and contact d2.

Suppose now that a vehicle arrives on the road EW, relay D will be energized due to the operation of a traffic detector DEW and since contacts C6 are closed, the operating circuit for relay J is completed over armature d2 for striking lamp FJ so that relay J is energized and the solenoid is operated at armature j1 and the cam shaft is moved to position 1. In this position the lamp ANS is lighted in place of GNS and lamp AEW is lighted in addition to lamp REW if the cross-connecting switch 36 is closed. Moreover, a new charging circuit is completed for condenser QJ over cam contacts C13, the adjusting switch LNS and the appropriate charging resistance 20. Relay D moreover was locked up over armature d1 and contacts C7 so that as soon as the condenser QJ has been charged sufficiently which will occur after a few seconds only, relay J is again operated over the circuit via contacts C6 and d2 and advances the cam shaft to position 2. In this position lamps GEW and RNS only are lighted and the vehicle in the street EW secures right of way. Furthermore a new charging circuit is now completed for condenser QJ, this time over contact C14 and switch IEW. Consequently, after the period corresponding to the resistance now included in the charging circuit, relay J is again operated by condenser QJ over the circuit via tube FJ, contacts C6 and contacts d2, and the solenoid steps the cam shaft to position 3. This produces no change in the lights but the charging circuit for condenser QJ now extends over contacts C15 and the switch VEW through resistance 20. Moreover, relay D is deenergized by the opening of its locking circuit at contacts C7 and owing to the closure of contact C16 a circuit is prepared for shunting condenser QJ by resistance YE via relay contact d2. If there is no further traffic, relay D will remain deenergized and contact d2 will remain open so that the condenser QJ will become fully charged but until relay E for the N—S road is operated the contact e will be open and since also cam contact C6 is open in this position 3, relay J cannot be operated and condenser QK cannot be charged so that neither relay J nor relay K is operated and the cam shaft remains in position 3 with right of way on the E—W road. This will be seen by tracing the new operating circuit for relay J from the positive side of condenser QJ via tube FJ, relay J, cam contacts C17 and relay contacts e2 to the negative side of condenser QJ, and also by tracing the negative side of the charging circuit of condenser QK via contacts C17 and e2.

ever, relay D is again operated and shunts the condenser by way of the comparatively low resistance YE, contacts C16 and contact d2 and thus extends the time which will be required for the condenser QJ to be charged to the striking voltage of the lamp FJ. It may be pointed out that since in these circumstances relay D is only operated while the vehicle is actually passing over the detector pad, the amount of extension obtained is dependent on the speed of the vehicle, being greater for a slow moving vehicle than for a fast moving one.

If now a vehicle should arrive on the road NS, relay E will be operated and via contacts e2 and contacts C17 will complete a circuit for effecting the operation of relay J as soon as condenser QJ is sufficiently charged. Hence, if a break of sufficient length to permit the striking voltage of the neon lamp FJ to be reached occurs in the traffic on the road EW, relay J will be operated and will advance the cam shaft to positions 4, 5 and 6 in turn in the manner previously described but by successively charging condenser QJ over adjusting switches LEW, INS and VNS to give right of way to the road NS.

In case, however, the traffic on the road EW should be substantially continuous, that is to say, there should be no break in traffic flow sufficiently long to permit condenser QJ to charge up, the maximum timing circuit involving the condenser QK comes into operation. It will be noted that this circuit comes into operation as soon as there is a waiting vehicle on the road NS at which time relay E is operated and locks up over contacts e1 and contacts C18. The charging circuit for condenser QK now extends over contacts C12 and the switch MEW, resistance 21, condenser QK, contacts C17 and contacts e2 by means of which a portion of resistance 21 is connected in circuit which will permit the condenser QK to charge up only after an interval considerably greater than that required for the charging of condenser QJ.

It is assumed in the present case that the road NS is the main road extending through the various intersections and it will be seen from the fact that cam contacts C8 are only opened in position 6 that if there should be a continuous stream of traffic coming from the road EW, that is the side road, the main road will receive right of way as soon as the condenser QK becomes sufficiently charged because relay K which also operates the solenoid S over armature k1 has its operating circuit completed over contacts C8 in position 3 of the cam shaft. The operating circuit for relay K extends from the right side of condenser QK via cam contacts C8, tube FK, relay K, to the left side of condenser QK. In the case, however, of continuous traffic on the main road, that is NS, with traffic waiting on the side road EW, even though the condenser QK becomes sufficiently charged it is impossible for it to discharge through relay K and neon lamp FK until the instant armature c'1 is closed against its cooperating contact as contacts C8 are opened in the NS right of way position 6. Master control relay C' is operated for a brief period once in each cycle of the master timer which is arranged to extend a pulse for operating the relay C'. Relays corresponding to relay C' and located at the other intersections of the group are preferably arranged to be operated in a predetermined sequence.

Accordingly, if the traffic on the main road is substantially continuous so that the several individual controllers are working on their maximum periods, the actual instants at which the several controllers withdraw right of way from the main road are controlled by the master timer through relay C' and contact c'1 in each individual controller. Because the time sequence of operation of the several relays C' is determined by the master timer in accordance with the arrangement disclosed in British Patent 403,732 the time when each relay C' permits its associated controller to withdraw right of way from the main road may thus be adjusted for successive intersections along a main road to permit main road traffic to proceed with the minimum delay.

It will be noted that armatures d3 and e3 when operated serve to include resistances YF and YG in their respective amber timing circuits so that when right of way is being forcibly removed thus intercepting a stream of traffic, an extended amber period is given to facilitate clearing the crossing. Control of the effectiveness of contacts d3 and e3 may be obtained by means of the amber extension switches ENS, EEW.

The switches PNS and PEW are so-called arterial switches and when operated ensure that right of way shall return to the associated street in the absence of traffic thereon. Their effect is to simulate the operation of the road pads at a time when the street in question is not receiving right of way by energizing the respective relays E and D in cooperation with cam contacts C18 and C7 respectively in all positions except 6 and 3 respectively, though they do not produce any extension effect when the street already has right of way unless the respective pads are operated. It will be obvious that with both these switches closed the controller will operate cyclically for minimum right of way periods with such periods extendable by traffic actuation.

The solenoid S is provided with three sets of contact springs of which s2 and s1 serve to shunt condensers QJ and QK by low resistances YJ and YK respectively to assure that the condensers will be fully discharged and ready to start the next timing action following each operation of the solenoid to step the camshaft from one position to the next. Contact spring s3 is effective in conjunction with armature k2 to ensure that without any further operation of the associated detector right of way shall be returned to the street from which it has been forcibly removed by action of the maximum timing condenser QK when the latter operates relay K to terminate right of way in the street. It will be noted that the armature and contact k2 of relay K cross connect the two relays D and E. Since the operation of relay K results after charging of condenser QK and since the latter requires as pointed out above the closure of either contacts d2 or contacts e2 it will be appreciated that when relay K operates causing termination of right of way on one street at the expiration of a maximum timing period, there must also have been operation of the road relay on the other street. For example if the camshaft is in position number 6 with the right of way on NS then the charging of condenser QK and subsequent operation of relay K is initiated by the closing of contacts d2 resulting from operation of relay D, the EW road relay. Now in such case if successive vehicles on the NS street prevent condenser QJ from being fully charged, and relay K is operated by condenser QK then contacts k2 will cross-connect relay D, which has been continuously operated, with relay E which is being only intermittently operated, so that now as the camshaft shifts from position 6 to position 1 and interrupts right of way on the NS street the relay E will be energized from relay D which was already energized. Such energization of relay E will be followed immediately by the locking up of relay E over its contacts e1 and cam contacts C18 as described before as soon as the camshaft has shifted to position 1. During the transition from position 6 to position 1 while the solenoid S is operating the solenoid contacts s3 cross-connect the locking circuits of relays D and E so that grounded power via contact d1 and s3 will be connected to contacts e1 to relay E so as to assure no interruption of energization of this relay at this instant. The energization of relay E as described by contacts k2 and relay K will have the same effect as if relay E were energized by operation of the detector DNS on the north-south street, and will cause subsequent return of right of way to the NS after completion of the appropriate timing period for the EW street.

It will be understood that the master timer and associated control relays are operated continuously so that relay C' in each individual controller is operated once each cycle. This operation only produces any effect however if the traffic on the main road is so heavy as to run the controllers up to their maximum timing periods.

An embodiment of the invention will now be described in which a right of way controller of the type shown in Figure 2, having detectors in the several lanes of approach to the intersection, and with the modifications which will be disclosed in connection with Figure 1, serves as a key controller.

The master timer is associated with the key controller and may comprise a rotary stepping switch DST well known to those familiar with the art. The wiper arms of the switch are advanced step by step by a magnet DSM energized periodically by impulses which in this embodiment of the invention originate from a condenser-flasher tube arrangement in which a condenser QB' is slowly charged from a high voltage D. C. supply via a high resistance 22 to the flash potential of a neon tube N in parallel with condenser QB' whereupon the condenser flashes through tube N to operate a relay Z in series with the tube. Relay Z on operating, operates relay F over armature z1. Relay F in turn at armature f2 completes the circuit for the driving magnet DSM, at armature f1 connects negative potential to the wipers of the switch DST, and at armature f3 shunts the neon lamp N and relay Z by way of resistance YB. Relay Z thereupon releases and upon the release of relay F after its slow period due to a copper slug on its core, the driving magnet is deenergized to advance the wipers on to the next set of bank contacts. This action continues automatically as long as the master timer is in service. One bank and wiper of the switch DST is allotted to each controller to be regulated and in Figure 1 only two such banks are shown; bank 4a arranged for operating relay R to control the key controller, bank 2a for operating relays B and C' at the dependent controller of Figure 2 in which control by relay C' only is shown. Relay B is operated twice per cycle, each time wiper 34 engages contacts 33 and 35. Relay C', which is of the marginal type, is operated only once per cycle, when wiper 34 engages contact 35, and is not operated by the partial line voltage supplied via contact 33 and resistance 32. As mentioned above, the local dependent controllers, for all intersections of the group except the key intersection which is vehicle actuated, may be either full or semi-actuated type or may be of the type in which impulses from the master timer control the time when right of way is accorded to the main and cross roads.

Referring now to Figure 1, there are reproduced herein portions of Figure 2 in which modification or addition is required for the use of such a controller at a key intersection according to the invention, the balance of Figure 1 representing principally the road relays D and E and road contacts DEW and DNS, as well as the signal cams and circuits it will be understood are assumed to be a part of Figure 1. The timing circuits of the key controller are now connected to ground from terminal 56 either over break contacts of a relay G or make contacts of a relay H instead of directly to ground as in Figure 2. The term "break contacts" is used here to describe the contacts closed only when the relay is de-energized and the term "make contacts" is used to describe the contacts closed only when the relay is energized. Relay G is energized by the closure of an added pair of cam contacts C23 during the main road vehicle interval (shaft position 6), and this breaks the timing circuit to ground at g1, until relay H is energized. A circuit to energize the relay H is completed by armature r1 when the latter is attracted by relay R which is energized in a certain position or positions of the master timer DST by its wiper 13. Relay H may be locked in during the main street vehicle interval over armature h2 and cam contacts C24. It will be understood that the relay R may be placed with the key controller instead of with the master timer as shown in Figure 1, if desired, the circuits remaining the same as in Figure 1.

A circuit from low voltage D. C. positive over armature r2, when relay R is energized, is completed over armature g2, either to timing increase magnet INM, or to timing decrease magnet DEM of a double-acting rotary switch DDT, depending upon whether g2 be engaging contact 31 or contact 30 respectively.

The rotary stepping switch DDT is of a type provided with two stepping mechanisms so connected that the wiper arm 12 may be operated over its contact bank in either direction. For this purpose magnet DEM is arranged to notch in one direction the ratchet wheel 25, Figures 3 and 4, mounted on shaft 26, and magnet INM is similarly fixed to notch ratchet wheel 27, on the shaft 28, in the opposite direction of rotation to shaft 26. The differential gearing permits member 29 to revolve in either direction, depending upon whether shaft 26 or 28 is rotated. Wiper 12 is mounted on member 29 and is suitably shaped to revolve over its associated bank of contacts of the switch DDT either clockwise or counterclockwise.

Again referring to Figure 1, the contacts of switch DDT are connected to points which may preferably be equi-distant on rheostat 22, which is in the charging circuit of condenser QB' which in turn through the flasher tube N controls the time rate of impulsing of magnet DSM of the master timer stepping switch DST by way of relays Z and F.

Assume now that the solenoid of the key controller steps its camshaft into shaft position 6, the NS or main street vehicle interval position. Cam contacts C23 are closed energizing relay G. Thus at armature $g1$ the lead at 56 for the NS vehicle interval and maximum timing circuits becomes disconnected from ground, thereby stopping all timing. A particular contact on the bank $4a$ of the rotary switch DST in the master timer is selected in accordance with the predetermined progressive plan for operating the dependent controllers so that the wiper 13 comes into engagement with this contact at the same time as the cam contacts C23 close, when the master timer and the key controller are operating on the same length cycle.

When the master timer and the key controller, due to traffic conditions affecting the latter, are not operated on the same length cycle and if the master timer is operating on a longer cycle than the key controller, relay R, which is connected to the synchronizing contact of bank $4a$, will be energized after relay G, and when relay R has attracted armature $r1$, relay H is energized and locked in over its armature $h2$ and cam contacts C24. This pair of contacts is closed only during the NS vehicle interval, shaft position #6. Relay R at armature $r2$ completes a circuit over armature $g2$ to energize decrease-magnet DEM of double acting rotary switch DDT. Accordingly magnet DEM causes wiper arm 12 to be stepped clockwise one contact, thereby reducing the amount of resistance 22 in the charging circuit of condenser QB'. The frequency of impulses from the impulsing circuit to magnet DSM of the master timer is thus increased and consequently the time for one cycle of the master timer is decreased.

In the circumstances described, since relay R has operated after relay G, when the master timer is operating on a longer cycle, the decrease magnet DEM, energized, reduces the master timer cycle time by a certain amount, for instance 4%. If however, relay R is operated before relay G, which sequence occurs when the master timer is operating on a shorter length cycle than the key controller, the increase magnet INM is energized over contact 31, armature $g2$, and armature $r2$, wiper arm 12 is stepped counterclockwise one contact, thereby increasing the resistance 22 in the impulse-generating circuit, and the master cycle time is increased say by 4%. As already explained, relay R upon being energized, pulls in relay H which locks-in at armature $h2$, and at armature $h1$ reconnects the lead for the timing circuits at point 56 to ground, whereupon the key controller recommences normal timing; the condensers QJ and QK begin to charge and upon operation of relay J or K the cam shaft is advanced into position 1. When the cam shaft is stepped into the amber leaving phase A position the cam contacts C23 and C24 open; relays G and H drop out and the key controller and master timer operate thru their next cycle independently.

It will thus be seen that successive energizations of relay G are raced against successive energizations of relay R in successive cycles. If the cycle time of the key controller is longer than that of the master timer, in which case relay R is energized before relay G, the next cycle of the master timer is lengthened; if the cycle of the key controller is shorter than that of the master timer, in which case relay R is energized after relay G, the key controller timing is interrupted until the master timer completes its cycle, and the next cycle of the latter is decreased.

In lieu of the arrangement just described in which the armatures $g1$ and $h1$ are inserted in parallel between terminal 56 and ground, it will be obvious to those versed in the art that in an alternative arrangement terminal 55 may be connected to ground and the armatures $g1$ and $h1$ placed in parallel between terminals 55 (or ground) and 56. This effect is illustrated by shifting switch TZ to its ground position. Whereupon the relay G, when energized, instead of interrupting all timing breaks all except the charging circuit to condenser QJ. Thus the key controller will advance to its next shaft position, position #1, as soon as relay H is energized, if condenser QJ has reached the flash voltage of tube FJ, or as soon thereafter as the flash voltage is reached.

The armature $c'1$ of Figure 2 may be replaced in the case of the key controller by an armature $r3$ in the master timer for example, as shown in Figure 1, or the cam contacts C8 may be shunted altogether, since the arrangement to stop timing in the key controller in position 6 when this controller completes its cycle before the master timer holds the two machines closely in step, and renders other coordinating means unnecessary.

The term "controller" is used herein broadly to designate the mechanism located at the individual intersections for operating the signals thru a cycle of right of way indications and is sometimes referred to as a local controller. In the present embodiment this controller includes a timing device for determining the time periods of display of the different right of way and cautionary change indications in the cycle; this timing device may be subject to initiation and time variation by traffic operating traffic actuated devices in the case of traffic actuated controllers or may have fixed time periods in the case of non-traffic actuated controllers. In accordance with the invention one local controller may be selected as a key controller furnishing an appropriate sample of the traffic at a group of intersections and this is partially controlled by an external timer which is designated as a "master timer" or "master timing means" and serves to vary the time period of the master timer to more closely correspond with the time period of its own right of way cycle. The other local controllers may be subject to control of this master timer without varying the master timer.

The control of the dependent controllers by the master timer it will be observed, consists in providing impulses given periodically once or twice per cycle, or both, by the master timer to each dependent controller, and these impulses control the transfer of right of way indications by the dependent controllers at one or more points in the time cycle of the latter. Thus the master timer has a master time cycle with which it maintains the cycles of the different dependent controllers in substantial synchronism.

It will thus be seen that the present invention provides a system for synchronization of or adjustment of the cycle times of two cyclically operating timers such that at the end of each cycle of the secondary timer the length of the cycle of this timer may be lengthened or shortened by a unit amount to approximate more closely the length of the corresponding cycle of the primary timer.

Thus the several objects specifically brought out above, and others are achieved. It is to be understood that various modifications in the structural details or arrangements of the parts, or changes in the designs herein exemplified may be made without departing from the spirit of the invention as defined by the claims.

I claim:

1. A synchronizing system for primary and secondary cyclically operating timers each having a plurality of operating positions in its cycle of operation, said secondary timer comprising a cyclic rotary stepping switch and electrical timing circuit means for operating said stepping switch step by step through its cycle, and a variable resistance in said timing circuit for varying the time period of stepping said switch, said system including a first relay, means in said primary timer for energizing said first relay in a predetermined position in its cycle, a second relay, means in said secondary timer for energizing said second relay in a certain position in the cycle of said secondary timer, means including contacts operated by said first and second relays responsive to said first relay being so energized before and remaining so energized until said second relay is so energized to vary said resistance by a unit amount to decrease correspondingly the time period of stepping of said switch, and means including contacts operated by said relays responsive to said second relay being so energized before said first relay to vary said resistance by a unit amount to increase correspondingly the time period of stepping of said switch.

2. In a synchronizing system for primary and secondary cyclically operating timers, an operating circuit for said secondary timer, means including a variable resistance in said operating circuit for varying the length of the secondary timer cycle, a rotary stepping switch having a plurality of contact positions, contacts corresponding to said positions and connected to a plurality of corresponding points on said variable resistance, a wiper arm on said switch engageable with said contacts and rotatable in either of two directions, for including a greater amount of resistance in said timing circuit when rotated in one direction for increasing the next time cycle of said secondary timer and for including a lesser amount of resistance in said circuit when rotated in the other direction for decreasing such next time cycle of said secondary timer, means operable responsive to said secondary timer completing its cycle before said primary timer to cause the wiper arm of said switch to move one step in said one direction and means operable responsive to said secondary timer completing its cycle after said primary timer to cause the wiper arm to move one step in said other direction, whereby the next cycle of said secondary timer is varied in length to approach the cycle of said primary timer.

3. A control system for two cyclically operating timers, including a first relay means operated by the first of said timers during a predetermined part in its cycle, a second relay means operated by the second of said timers at a certain point in the cycle of said second timer, an operating circuit for said second timer, a resistance in said operating circuit to control the time cycle of operation of said second timer, contact means engaging with said resistance, a first electromagnet for operating said contact means to vary the amount of said resistance in said operating circuit to increase the time cycle of said second timer, a second electromagnet for operating said contact means to vary the amount of said resistance to decrease the time cycle of said second timer, means including a break contact operated by said first relay means and a make contact operated by said second relay means for operating said first electromagnet to so increase such time cycle responsive to closure of both said make and break contacts, means including said make contact of said second relay means and a make contact operated by said first relay means for operating said second electromagnet to so increase such time cycle responsive to closure of both said make contacts, whereby when said second timer reaches said certain point in its cycle after said first timer has reached said predetermined part of its cycle and while said first timer is in said predetermined part of its cycle said resistance will be varied to decrease the time cycle of said second timer, and when said second timer reaches said certain point before said first timer reaches said predetermined part of its cycle said resistance will be varied to increase the time cycle of said second timer.

4. A control system for two cyclically operating timers having a first timer and a second timer, said second timer comprising a rotary stepping switch having a plurality of switch positions and operable through such positions cyclically, a condenser, means including a resistance for varying the charge on said condenser from an initial to a final value, means responsive to said final value of charge to advance said switch from one position to the next; said system including a first relay means operated by said first timer in a predetermined part of its cycle, a second relay means operated by said second timer in a certain position of the switch, contact means engaging said resistance and adapted to be operated to vary the amount of said resistance in said charge varying means, means including a first electromagnet for operating said contact means to vary said resistance to increase the time required to reach said final value, means including a second electromagnet for operating said contact means to vary said resistance to decrease the time required to reach said final value, an operating circuit for said second electromagnet including make contacts operated by the respective said first and second relay means, and an operating circuit for said first electromagnet including said make contact operated by said second relay means and a break contact operated by said first relay means.

5. A synchronizing system for primary and secondary cyclically operating timers each having a plurality of operating positions in its cycle of operation, said secondary timer comprising a cyclic rotary stepping switch and electrical timing circuit means for operating said stepping switch step by step through its cycle, and a variable resistance in said timing circuit for varying the time period of stepping said switch, said system including a first relay, means in said primary timer for energizing said first relay in a predetermined position in its cycle, a second relay, means in said secondary timer for energizing said second relay in a certain position in the cycle of said secondary timer, means including contacts operated by said first and second relays responsive to said first relay being so energized before and remaining so energized until said second relay is so energized to vary said resistance by a unit amount to decrease correspondingly the time period of stepping of said switch, and means including contacts operated by said relays responsive to said second relay being so energized before said first relay to vary said resistance by a unit amount to increase correspondingly the time period of stepping of said switch, an operating circuit for said primary timer, contact means operated by said primary timer to energize said operating circuit last named to maintain cyclic operation throughout its cycle except in said predetermined position and to deenergize its operating circuit to interrupt cyclic operation in said predetermined position, and contact means operated responsive to said second relay being so energized to energize said operating circuit of said primary timer in said predetermined position to continue cyclic operation.

6. A control system for two cyclically operating timers having a first timer and a second timer, said second timer comprising a rotary stepping switch having a plurality of switch positions and operable through such positions cyclically, a condenser, means including a resistance for varying the charge on said condenser from an initial to a final value, means responsive to said final value of charge to advance said switch from one position to the next; said system including a first relay means operated by said first timer in a predetermined part of its cycle, a second relay means operated by said second timer in a certain position of the switch, contact means engaging said resistance and adapted to be operated to vary the amount of said resistance in said charge varying means, means including a first electromagnet for operating said contact means to vary said resistance to increase the time required to reach said final value, means including a second electromagnet for operating said contact means to vary said resistance to decrease the time required to reach said final value, an operating circuit for said second electromagnet including make contacts operated by the respective said first and second relay means, and an operating circuit for said first electromagnet including said make contact operated by said second relay means and a break contact operated by said first relay means, an operating circuit for said first timer, means including a break contact operated by said first relay to energize said last named operating circuit throughout the cycle operation of said first timer except in said predetermined position and to interrupt cyclic operation in said predetermined position responsive to said first relay means being so energized, and auxiliary energizing means for said operating circuit of said first timer including a make contact operated by said second relay for energizing said last named operating circuit in said predetermined position to continue cyclic operation responsive to said second relay being so energized by said second timer at said certain position.

ALFRED PERCY BAILEY RENSHAW.

CERTIFICATE OF CORRECTION.

Patent No. 2,180,300. November 14, 1939.
ALFRED PERCY BAILEY RENSHAW.

It is hereby certified that error appears in the printed specification of the above numbered patent requiring correction as follows: Page 2, second column, line 5, for "switchecs" read switches; page 3, first column, line 21, strike out the words "ever, relay D is again operated and shunts the" and insert instead the following -

If further vehicles arrive on the EW road however, relay
    D is again operated and shunts the ;

and that the said Letters Patent should be read with this correction therein that the same may conform to the record of the case in the Patent Office.

Signed and sealed this 12th day of March, A. D. 1940.

Henry Van Arsdale,
(Seal)                                     Acting Commissioner of Patents.